(12) United States Patent  
Kosasa

(10) Patent No.: US 8,185,035 B2  
(45) Date of Patent: May 22, 2012

(54) IMAGE FORMING SYSTEM

(75) Inventor: Hideaki Kosasa, Abiko (JP)

(73) Assignee: Canon Kabushiki Kaisha (JP)

( * ) Notice: Subject to any disclaimer, the term of this patent is extended or adjusted under 35 U.S.C. 154(b) by 1016 days.

(21) Appl. No.: 12/119,822

(22) Filed: May 13, 2008

(65) Prior Publication Data

US 2008/0285076 A1   Nov. 20, 2008

(30) Foreign Application Priority Data

May 15, 2007  (JP) ................................ 2007-129404

(51) Int. Cl.  
*G03G 15/00*  (2006.01)

(52) U.S. Cl. ............ 399/362; 399/407; 399/408; 412/2; 412/11

(58) Field of Classification Search .................. 399/362, 399/366, 407; 412/2, 18, 11  
See application file for complete search history.

(56) References Cited

U.S. PATENT DOCUMENTS

| | | | |
|---|---|---|---|
| 6,397,020 B1 * | 5/2002 | Kim | 399/45 |
| 7,619,767 B2 * | 11/2009 | Horiuchi et al. | 358/1.15 |
| 7,768,663 B2 * | 8/2010 | Tran et al. | 358/1.15 |

FOREIGN PATENT DOCUMENTS

JP         2001-22239 A    1/2001

* cited by examiner

*Primary Examiner* — Matthew G Marini  
(74) *Attorney, Agent, or Firm* — Rossi, Kimms & McDowell LLP

(57) ABSTRACT

An image forming system which realizes reliable output of an original of a finished book, while maintaining security. A sheet-unique information-reading unit reads sheet-unique information unique to a sheet used for making a finished book based on image data. A memory section stores the sheet-unique information read by the sheet-unique information-reading unit in association with the image data based on which a finished book is made. In outputting an original of the finished book, a CPU causes an image forming device to perform image output based on the information stored in the memory section.

5 Claims, 19 Drawing Sheets

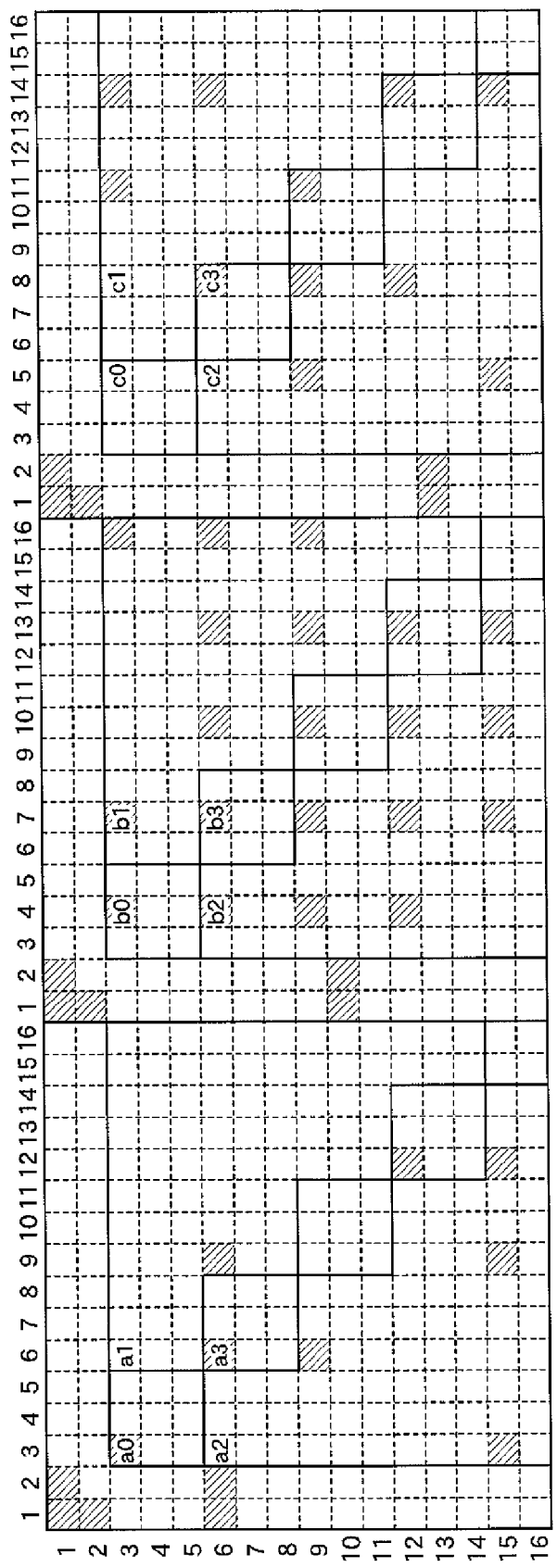

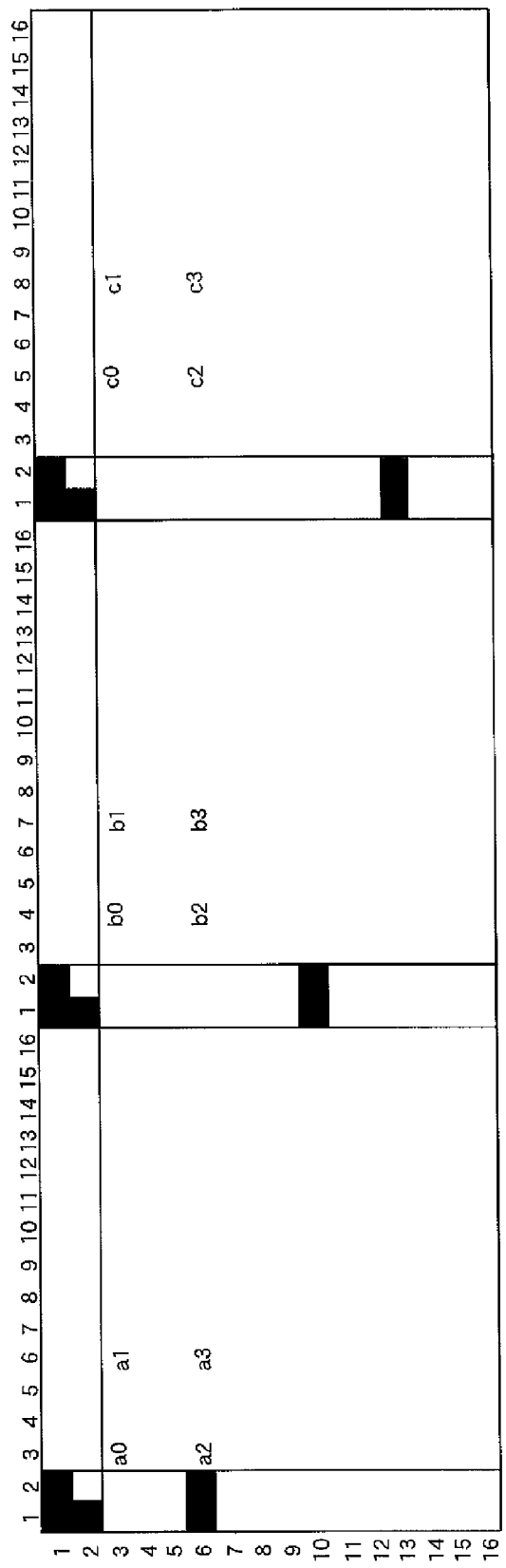

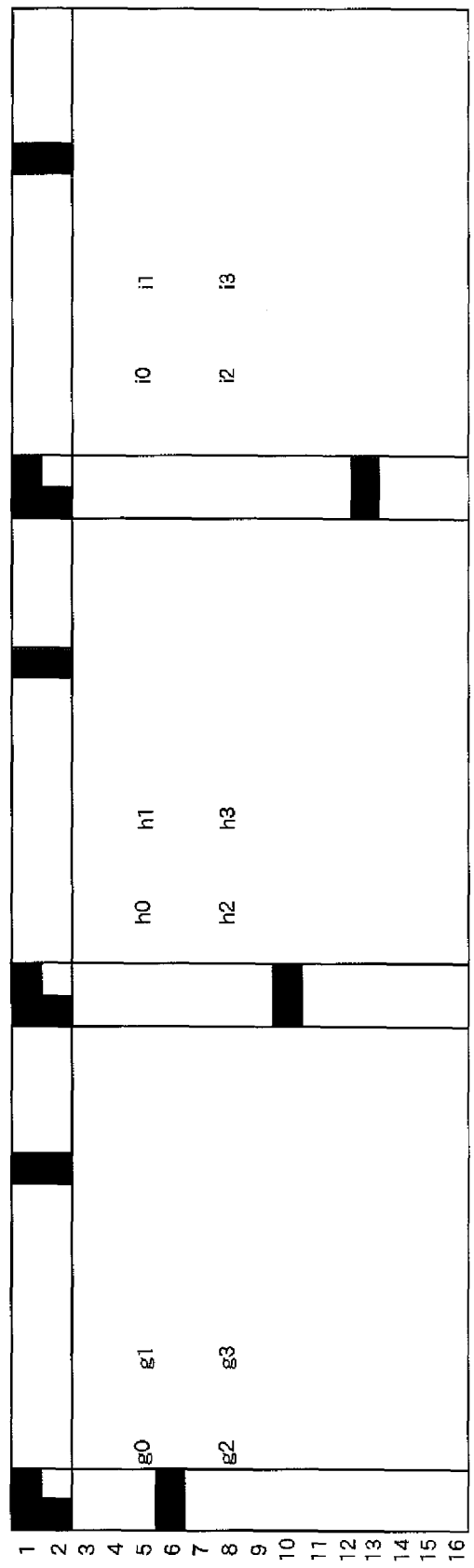

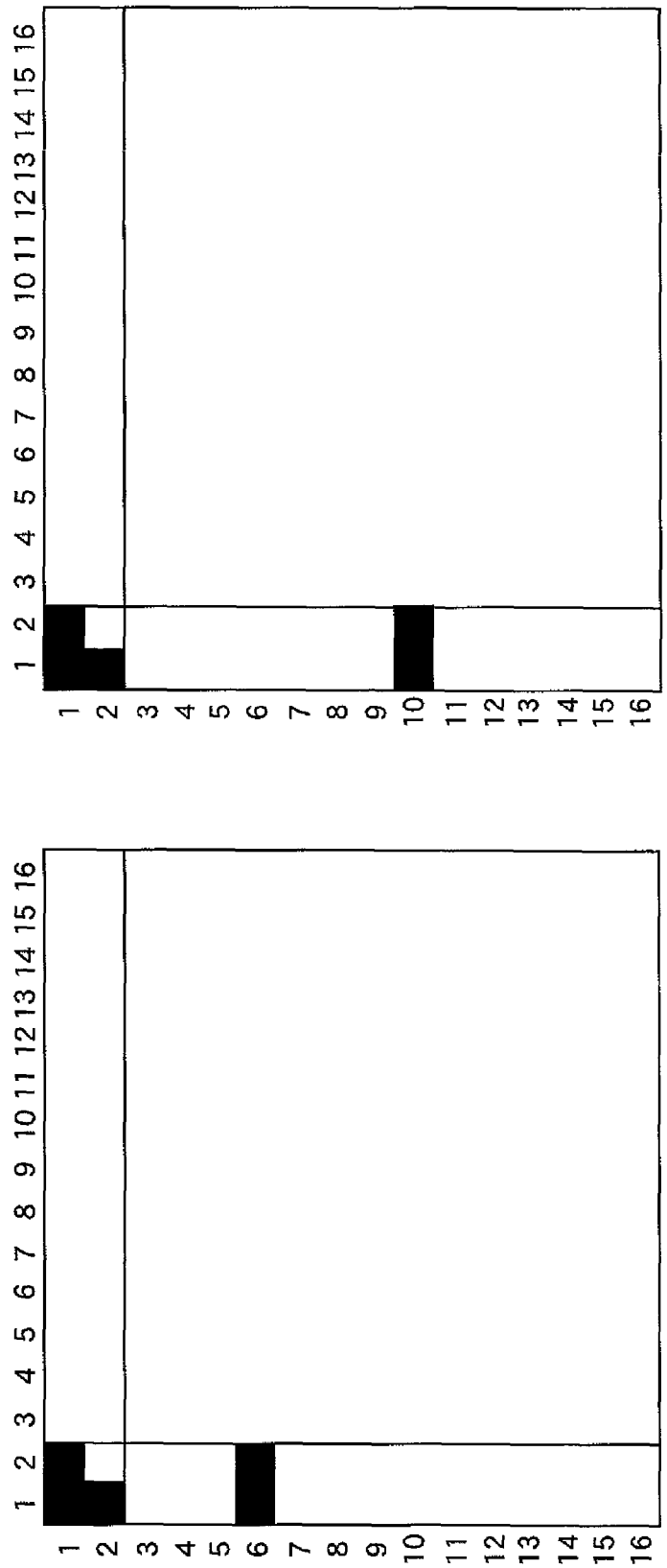

IMAGE FORMING SYSTEM

BACKGROUND OF THE INVENTION

1. Field of the Invention

The present invention relates to an image forming system to which a bookbinding apparatus can be connected.

2. Description of the Related Art

Due to the increased functionality of recent digital image processing apparatuses and the like, in order to prevent an unauthorized operation such as unauthorized access via the network to output a classified document or the like, it becomes necessary to manage users who operate an image processing apparatus or the like. To this end, personal authentication is performed to thereby identify a user and improve security.

Further, Japanese Laid-Open Patent Publication No. 2001-22239 discloses an image processing apparatus which performs personal authentication (fingerprint authentication). According to the publication, it is determined whether or not image data has digital watermark information, and it is determined from the information whether or not the document to be copied is classified. If it is a classified document, personal authentication is performed on a person who attempts to copy the document and printing is permitted only when the person is authenticated.

However, the conventional configuration has the following problems:

(1) In copying a finished book made by bookbinding, it is required to unbind the finished book into separate sheets again.

(2) In the case of (1), if the finished book suffers from miss gathering, it is copied with the defect of miss gathering.

(3) Even if an original image used for making a finished book has been changed, a change in the original image is not reflected on the copy which is output.

SUMMARY OF THE INVENTION

The present invention provides an image forming system which realizes reliable output of an original of a finished book, while maintaining security.

The present invention provides an image forming system in which an image reading device, an image forming device, and a bookbinding apparatus are connected, comprising a sheet-unique information-reading unit configured to read sheet-unique information unique to a sheet used for making a finished book based on image data, a storage unit configured to store the sheet-unique information read by the sheet-unique information-reading unit in association with the image data, and a control unit configured to cause the image data stored in association with the sheet-unique information in the storage unit to be output to the image forming device, based on the sheet-unique information of the sheet used for the finished book, when outputting the image data based on which the finished book is made.

The image forming system according to the present invention includes a sheet-unique information-reading unit configured to read sheet-unique information unique to a sheet used for making a finished book based on image data. Further, the image forming system includes a storage unit configured to store the sheet-unique information read by the sheet-unique information-reading unit in association with the image data. Furthermore, the image forming system includes a control unit configured to cause the image data stored in association with the sheet-unique information in the storage unit to be output to the image forming device, based on the sheet-unique information of the sheets used for the finished book, when outputting the image data based on which the finished book is made.

Thus, original images of a finished book are output based on the image data linked to the sheet-unique information, it is possible to realize reliable output of an original of a finished book while maintaining security.

The features and advantages of the invention will become more apparent from the following detailed description taken in conjunction with the accompanying with drawings.

BRIEF DESCRIPTION OF THE DRAWINGS

FIG. 9 is a diagram showing an example of an image of an interference pattern read by the sheet-unique information-reading unit shown in FIG. 6 or 8.

FIGS. 10A and 10B are diagrams useful in explaining an example of a dispersing process required to add the image of the interference pattern read by the sheet-unique information-reading unit shown in FIG. 6 or FIG. 8 to the image data.

FIGS. 12A to 12C are first diagrams which is useful in explaining how respective addresses of pixel areas are allocated when a dispersion is performed by the dispersing method appearing in FIG. 11.

FIGS. 13A to 13I are second diagrams useful in explaining how the respective addresses of pixel areas are allocated when the dispersion is performed by the dispersing process appearing in FIG. 11.

DETAILED DESCRIPTION OF THE PREFERRED EMBODIMENTS

The present invention will now be described in detail below with reference to the accompanying drawings showing preferred embodiment thereof.

Figure 1:
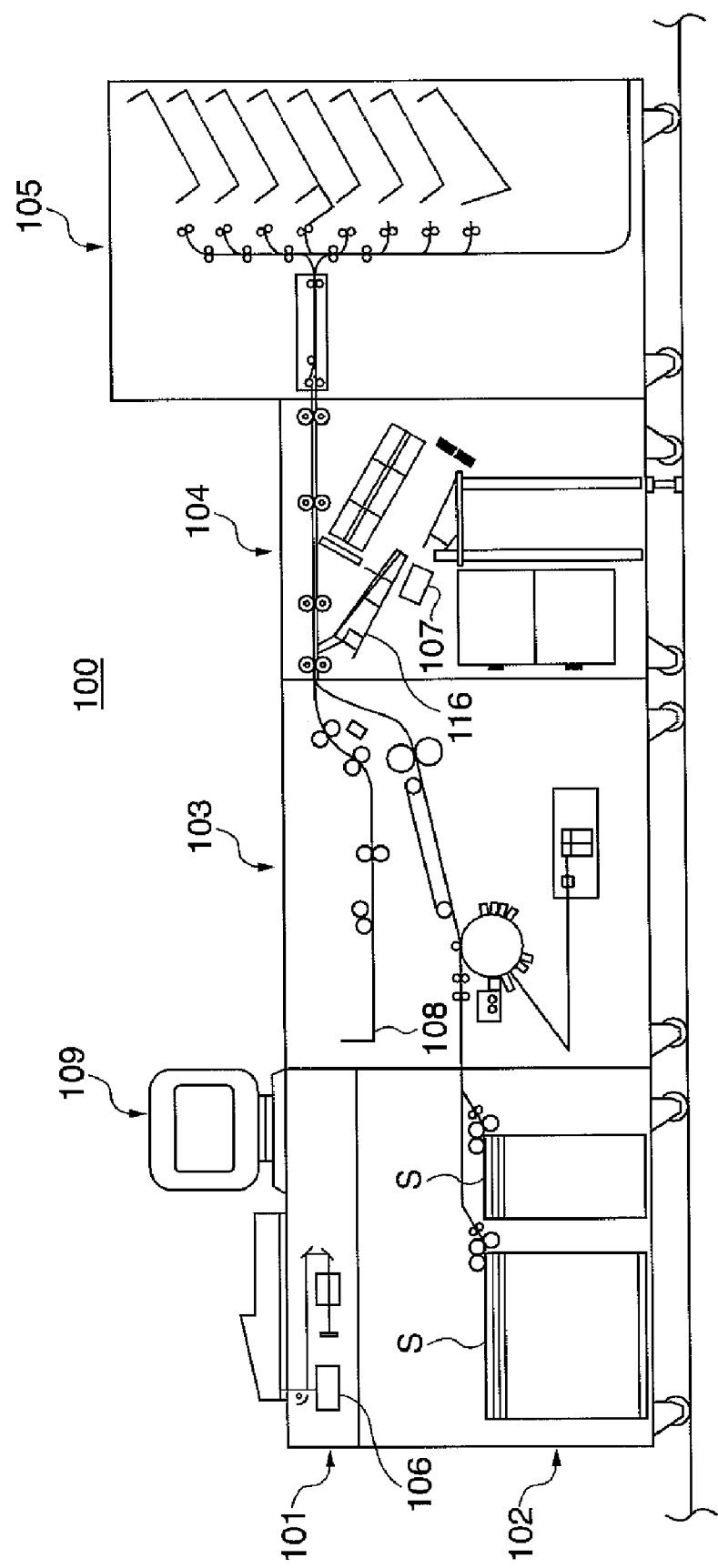
FIG. 1 is a diagram showing the arrangement of an image forming system according to an embodiment of the present invention.

FIG. 1 is a diagram showing the arrangement of an image forming system according to an embodiment of the present invention.

The image forming system 100 in FIG. 1 includes an image reading device (scanner device) 101 that reads images on respective sheets of originals, and a sheet feeder 102 that feeds sheets S on which the images are to be formed. The image forming system 100 also includes an image forming device 103 that forms the images on the sheets S based on image information read by the image reading device 101, a bookbinding apparatus 104 that binds the sheets S having the images formed thereon, and an assorting and storing device 105 that assorts products made by bookbinding.

The image forming system 100 also includes a first paper pattern-detecting unit 106 (a sheet-unique information-reading unit) as a means for reading sheet-unique information from a sheet S set on the image reading device 101, and a second paper pattern-detecting unit 107 (a sheet-unique information-reading unit) that is disposed within the bookbinding apparatus 104. The image forming system 100 also includes an inserting device 108 that feeds interleaved sheets into the bookbinding apparatus 104, and an operating display section 109. The bookbinding apparatus 104 also includes a sheet aligning section 116.

Data of images read by the image reading device 101 is transmitted to the image forming device 103 and the image forming device 103 can form images on the sheets S fed by the sheet feeder 102. The sheets S on which the images are formed are conveyed into the bookbinding apparatus 104 where they are bound into a book. After bookbinding, the finished book is conveyed to the assorting and storing device 105 where it is subjected to assorting. It should be noted that as described hereinafter, in the present embodiment, a detailed description is given of a case where book-making data prepared by a client PC 200 is stored in a memory section 303 of a host server 300, and the image forming device 103 reads the book-making data from the memory section 303 to form images on sheets S.

The second paper pattern-detecting unit 107 is disposed in the sheet aligning section 116 of the bookbinding apparatus 104, and is configured such that even when a sheet having no image formed by the image forming device 103 forms a front cover or a back cover of a finished book, it is capable of reliably detecting a patter pattern on the sheet forming the front cover or the back cover. Now, the case where a sheet having no image formed by the image forming device 103 forms the front cover of a finished book is a case where a sheet fed from the inserting device 108 forms the front cover of the finished book. In other words, the sheet forming the front cover is not passed through the image forming device 103.

Now, the "paper pattern" is intended to mean an asperity pattern of natural fiber on a surface of a sheet made from wood pulp as a raw material, and the present invention pays attention to the fact the paper pattern is different from paper to paper just as a human fingerprint is unique to an individual person. In the present embodiment, a 1 or 2 mm-square portion of a sheet desired to be identified is scanned to form an image of the asperity pattern of the natural fiber, and a pattern of light and dark of the asperity pattern image is converted into a digital signal, for storage as data. When a sheet is fed, a paper pattern thereof detected by the first or second paper pattern-detecting unit is checked using analysis software to see if the sheet is of the same paper.

Figure 2:
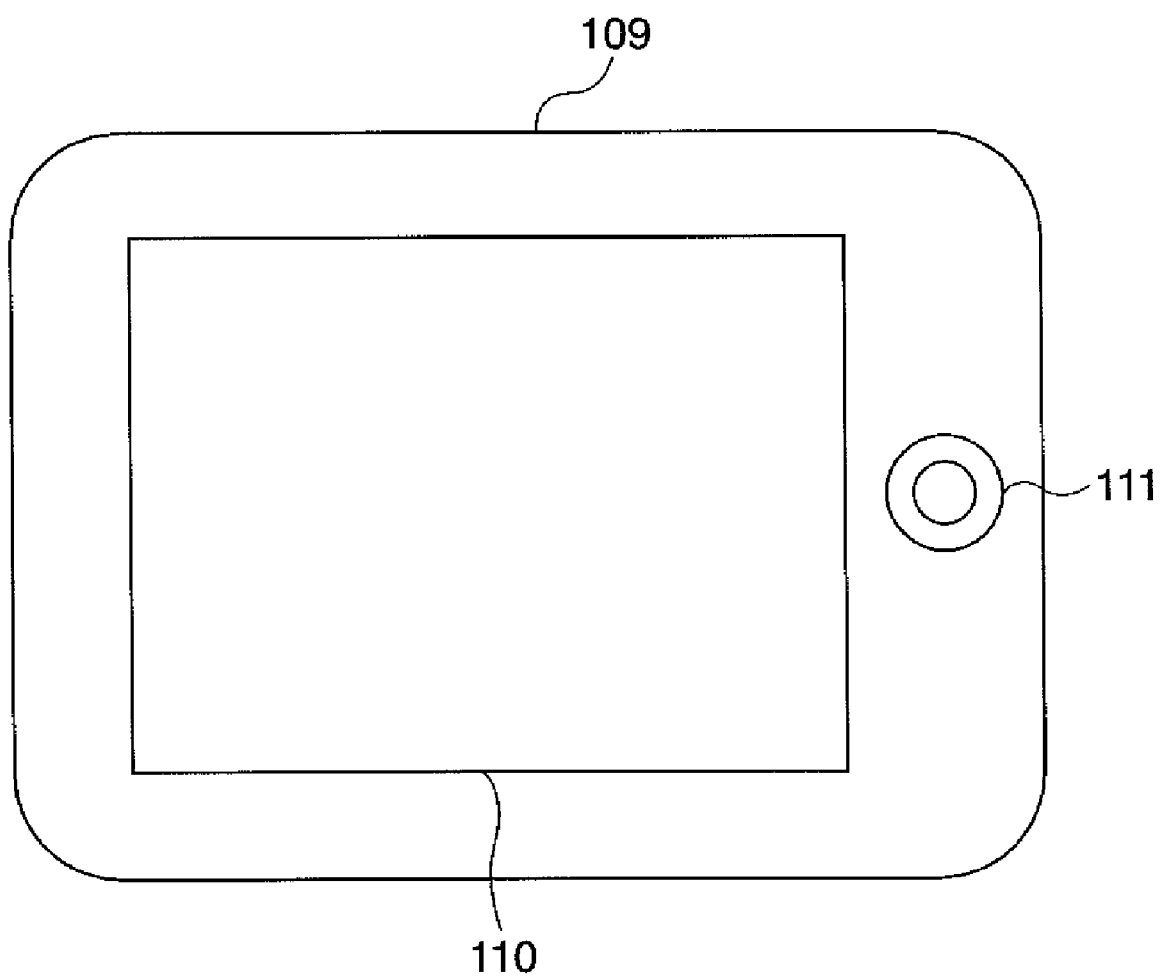
FIG. 2 is a diagram showing the arrangement of an operating display section appearing in FIG. 1.

FIG. 2 is a diagram showing the arrangement of the operating display section 109 appearing in FIG. 1.

The operating display section 109 includes an LCD display section 110 for indicating information on settings of printing (copying magnification, color designation, the number of sheets, a document mode, and so on). The operating display section 109 also includes a start key 111 that serves both as a copy button for instructing the start of a copying operation and a reading button for reading personal identification information (information on veins in a finger or a surface shape of the same).

Next, a description will be given of the processing operation of the image forming system 100 according to the present invention with reference to FIGS. 3 to 6.

Figure 3:
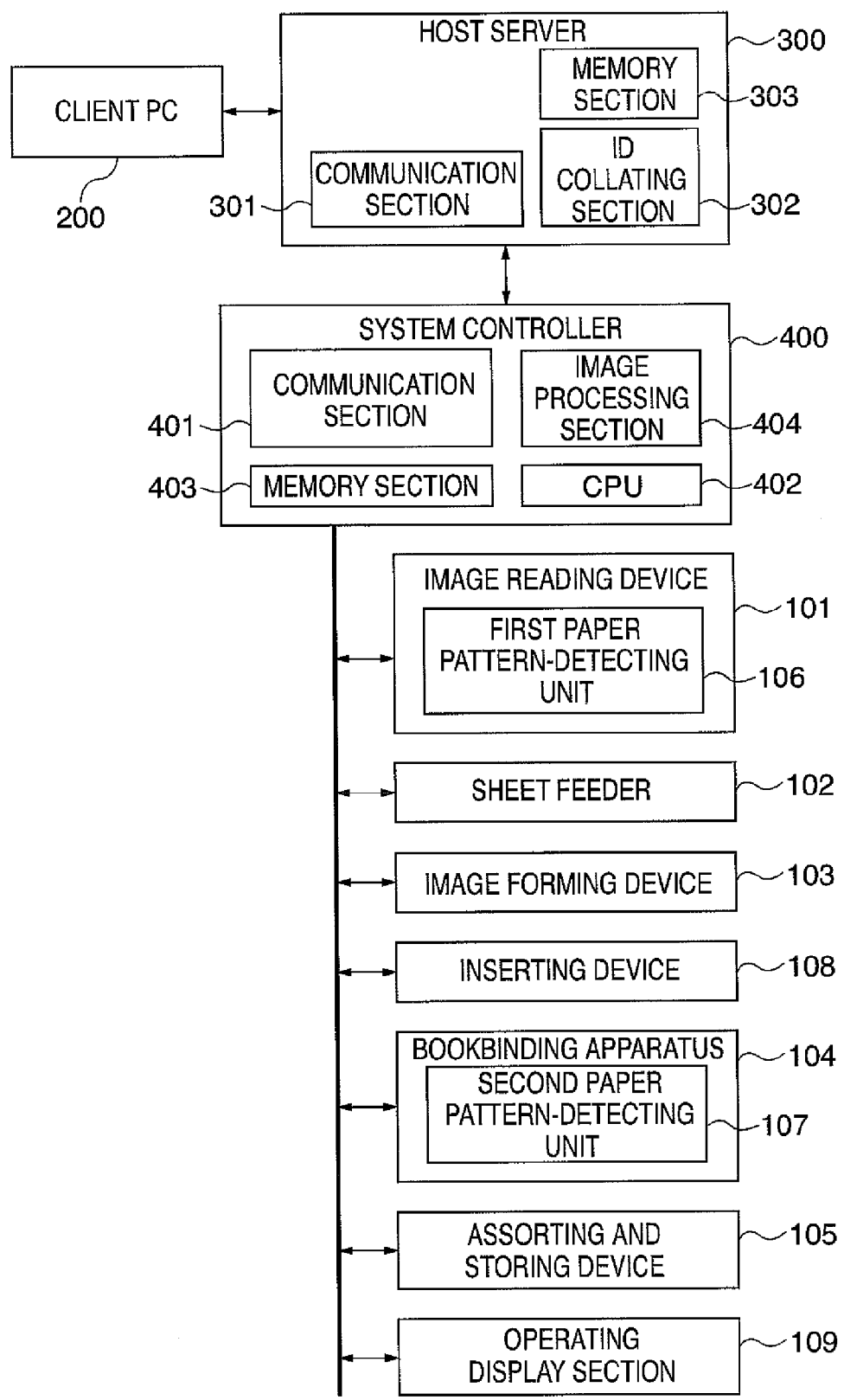
FIG. 3 is a control block diagram of the image forming system shown in FIG. 1, including devices connected to each other online.

FIG. 3 is a control block diagram of the image forming system shown in FIG. 1, including devices connected to each other online.

A system controller 400 includes a communication section 401 that communicates over the network, a CPU 402 (a control unit) that controls the entire image forming system, a memory section 403, and an image processing section 404.

The system controller 400 is connected to the image reading device 101 incorporating the first paper pattern-detecting unit 106, the sheet feeder 102, the image forming device 103, and the bookbinding apparatus 104 incorporating the second paper pattern-detecting unit 107.

Furthermore, the system controller 400 is connected to the assorting and storing device 105, the inserting device 108, and the operating display section 109, and at the same time it is connected to the host server 300 via the network.

The host server 300 incorporates a communication section 301 that communicates over the network, an ID collating section 302, and the memory section 303 that stores image data, and is connected to the client PC 200 via the network.

Figure 4:
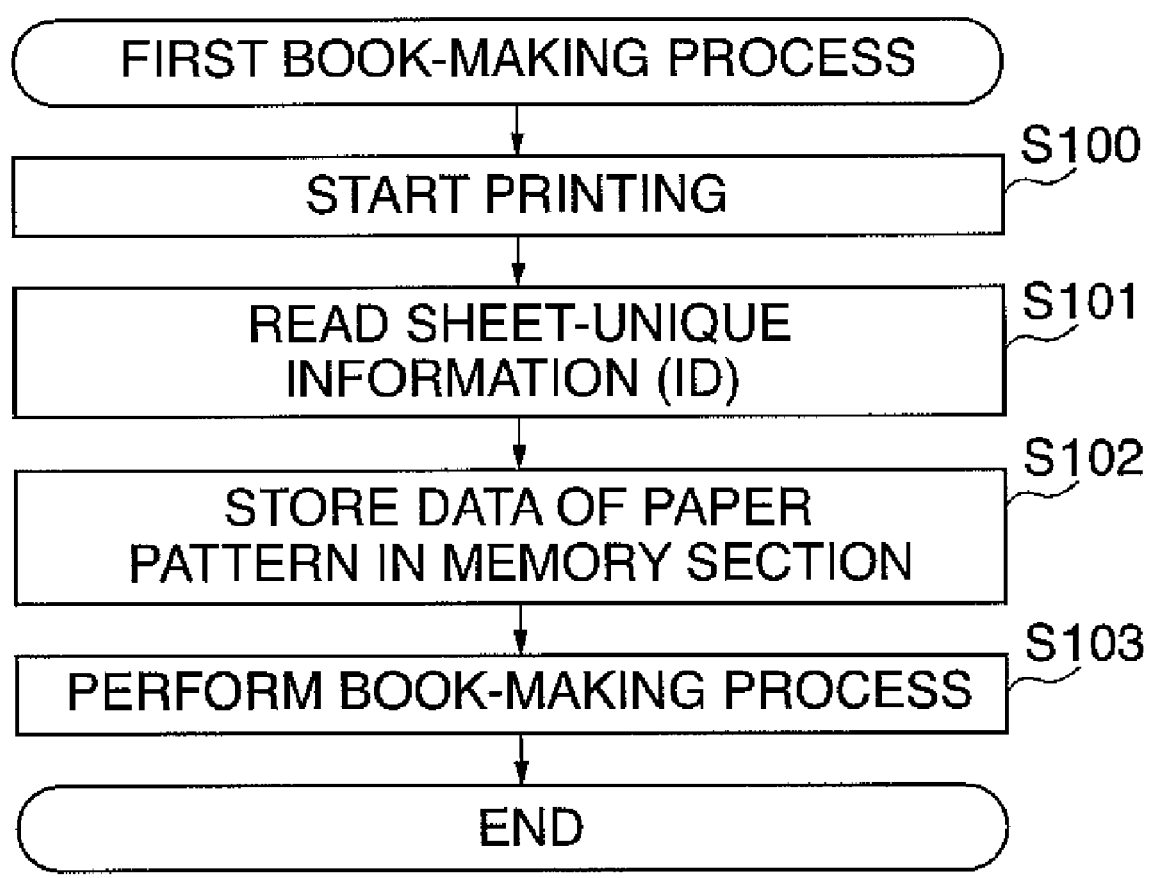
FIG. 4 is a flowchart of a first book-making process including a first paper pattern authentication process performed by the image forming system shown in FIG. 3.

FIG. 4 is a flowchart of a first book-making process including a first paper pattern authentication process performed by the image forming system shown in FIG. 3.

This process is performed by the system controller 400 appearing in FIG. 3.

Specifically, in the first book-making process in FIG. 4, an operator uses the client PC 200 connected to the network so as to make a book based on data of an original.

First, the operator sends a book-making command to the system controller 400 from the client PC 200 via the network and the host server 300. At this time, the client PC 200 transmits book-making data prepared thereby and personal authentication data (personal authentication information) or output authority associated with the book-making data over the network to the host server 300 for storage in the memory section 303 thereof.

The system controller 400 having received the book-making command sends a print start signal to the sheet feeder 102, the image forming device 103, and the bookbinding apparatus 104 (step S100). Next, a paper pattern (sheet-unique information; ID) of a front cover (the uppermost sheet of a finished book) conveyed to the sheet aligning section 116 of the bookbinding apparatus 104 is read by the second paper pattern-detecting unit 107 (step S101). Details of the paper pattern-detecting units will be described hereinafter.

After reading the paper pattern of the front cover, data of the paper pattern is stored in the memory section 403, and then is stored in association with the book-making data in the memory section 303 of the host server 300 via the network (step S102). After storing the data of the paper pattern, a book-making process is performed (step S103), followed by terminating the present process.

Figure 5:
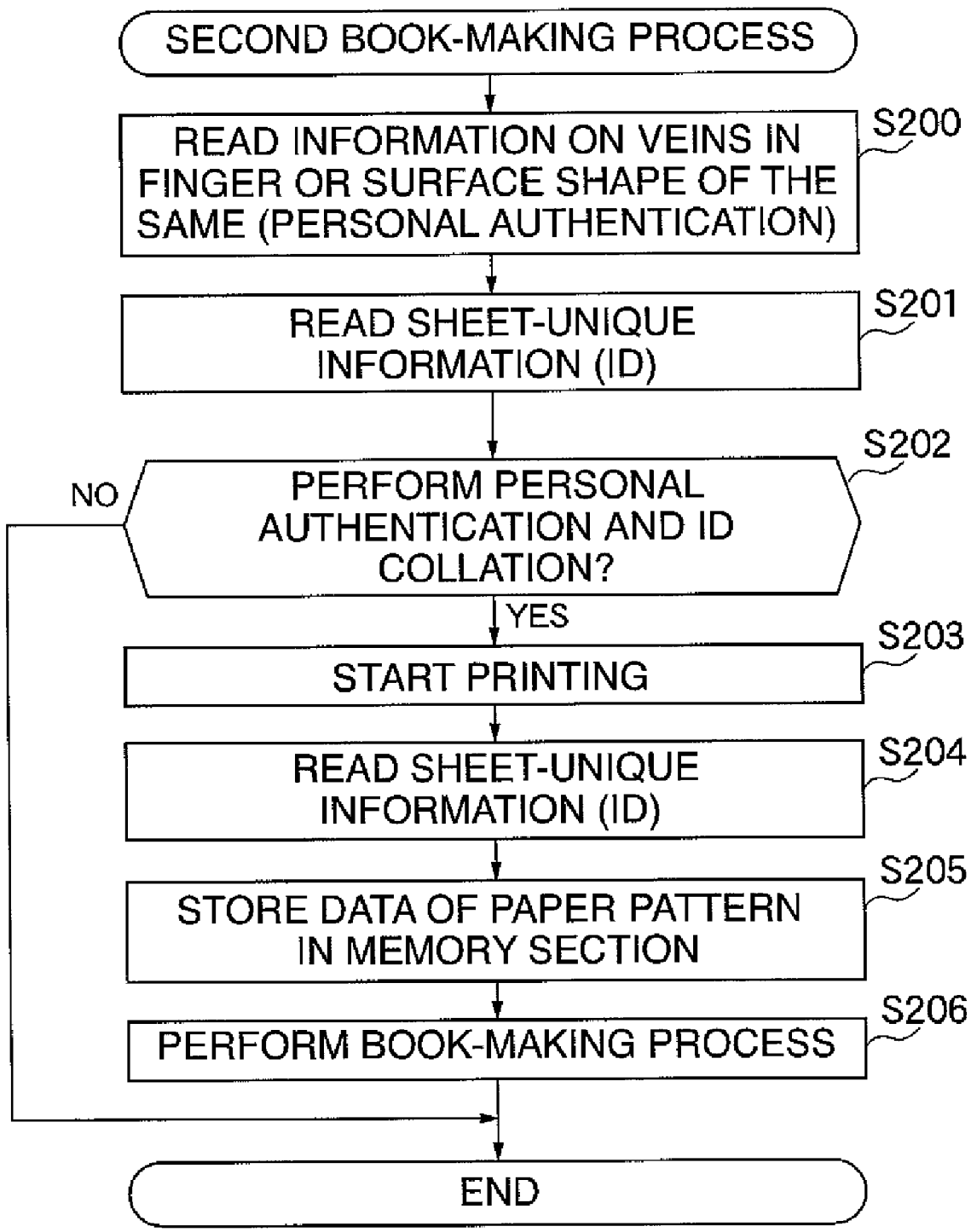
FIG. 5 is a flowchart of a second book-making process including a second paper pattern authentication process performed by the image forming system shown in FIG. 3.

FIG. 5 is a flowchart of a second book-making process including a second paper pattern authentication process performed by the image forming system shown in FIG. 3.

This process is performed by the system controller 400 appearing in FIG. 3.

Specifically, FIG. 5 shows a flow of making and delivering an original of the finished book based on the existing original of the finished book again.

First, the operator performs personal identification via the operating display section 109 (step S200). Here, simultaneously when the operator depresses the start key 111 to start printing, personal identification information (information on veins in a finger or a surface shape of the same) is read using the reading button as a personal identification means.

Next, the paper pattern (sheet-unique information) of the finished book placed on the original platen glass is ready by the first paper pattern-detecting unit 106 (step S201).

Next, personal authentication and ID collation are performed (step S202). Here, the ID collating section 302 determines whether or not the personal authentication data (personal authentication information) and the paper pattern of the sheet read as describe above are already registered in the memory section 303 of the host server 300 as the database.

If the personal authentication data matches the output authority of the book-making data stored in the memory section 303 of the host server 300, and the data of the paper pattern of the sheet matches that of the paper pattern stored in the same in association with the book-making data (YES to the step S202), the process proceeds to a step S203, wherein the printing of the book-making data stored in the memory section 303 of the host server 300 is started.

Next, the paper pattern of a printed front cover (the uppermost sheet of a finished book) which is conveyed to the sheet aligning section 116 of the bookbinding apparatus 104 is read by the second paper pattern-detecting unit 107 (step S204).

After reading the paper pattern of the front cover by the second paper pattern-detecting unit 107, the data of the paper pattern is stored in the memory section 403, and at the same time, it is stored in the memory section 303 of the host server 300 via the network in association with the book-making data and the result of the personal identification (step S205). After storing the data of the paper pattern of the sheet and data of the personal identification, the book-making process is performed (step S206), followed by terminating the present process.

If it is not confirmed from the personal authentication data that the operator has output authority, or the paper pattern data of the sheet does not match the paper pattern data stored in association with the book-making data (NO to the step S202), the present process is immediately terminated.

Next, a detailed description will be given of the first paper pattern-detecting unit 106 and the second paper pattern-detecting unit 107.

Figure 6:
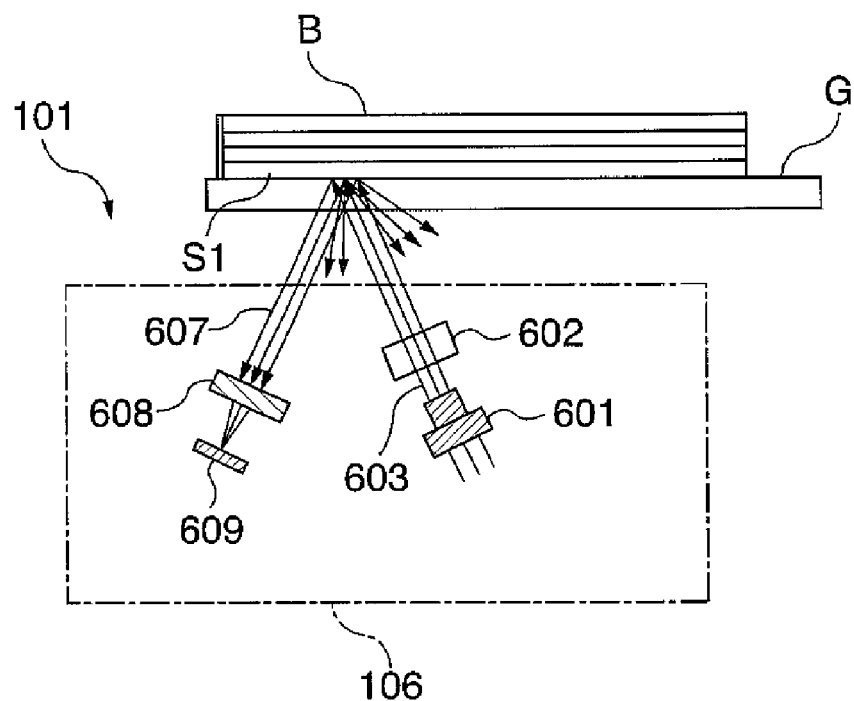
FIG. 6 is a diagram showing the arrangement of a sheet-unique information-reading unit (first paper pattern-detecting unit) which is mounted on an image reading device appearing in FIG. 1.

FIG. 6 is a diagram showing the arrangement of the first paper pattern-detecting unit 106 which is mounted on the image reading device appearing in FIG. 1.

The first paper pattern-detecting unit 106 having the present arrangement is a reading means which makes use of laser speckles. The laser speckles are an interference pattern observed when interference patterns are mutually intensified or weakened due to scattering of laser light. When a laser beam having a uniform wavelength and phase is reflected from a surface of an object which has microscopic asperities, interference of light occurs due to the microscopic asperities, and hence random small spots are observed to be formed.

Referring to FIG. 6, a laser beam 603 is generated using a laser light source 601 and a collimator lens 602 for collimating laser light emitted from the laser light source 601. The laser beam 603 passing through the platen glass G to be irradiated onto the front cover S1 of the finished book B is reflected as coherent light formed by interference of light due to the microscopic asperities on the surface of the cover S1, to thereby generate interference pattern-indicating reflected light 607.

The generated interference pattern-indicating reflected light 607 enters an image sensor 609 (is received thereby) through the imaging lens 608. The image sensor 609 is implemented by a two-dimensional image area sensor such as a CCD or CMOS area sensor that has a wavelength sensitivity capable of sensing the wavelength of the laser beam 603.

The laser light source 601, the collimator lens 602, the imaging lens 608, and the image sensor 609 in FIG. 6 are combined to form a unit for observing laser speckle.

Figure 7:
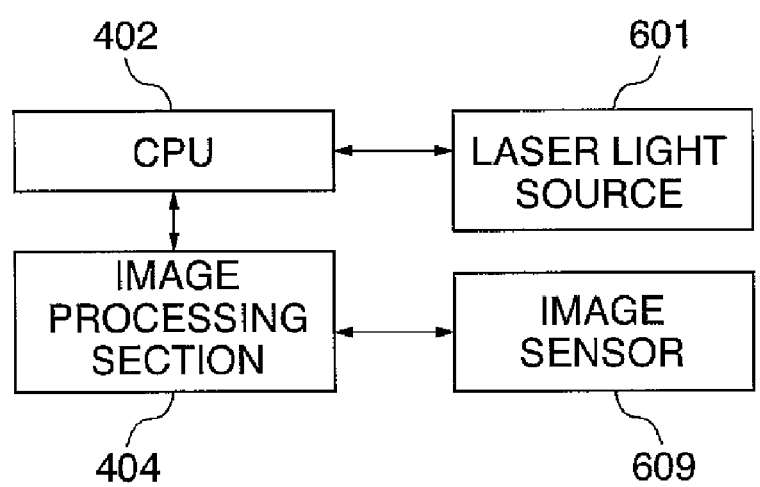
FIG. 7 is a control block diagram of the sheet-unique information-reading unit shown in FIG. 6.

FIG. 7 is a control block diagram of the first paper pattern-detecting unit 106 shown in FIG. 6.

As shown in FIG. 7, the laser light source 601 as a laser emitting means is controlled by the CPU 402, and the image processing section 404 binarizes the interference pattern-indicating reflected light 607 read by the imaging sensor 609.

The interference pattern obtained by the coherent light of the laser is observed or detected as a light and dark pattern of micro dots called "speckles". The size of each individual dot is typically represented by a function of a number of device parameters, such as the wavelength of laser light incident on a reflecting surface, the diameter of the laser beam, and the distance from the reflecting surface to an observer or a photo sensor.

If these device parameters such as the wavelength, the diameter of the laser beam, and the distance from the reflecting surface to the sensor are held constant, it can be assumed that statistical average of respective widths of speckles is a function of a value practically determined by the arrangement of the system, and is dependent on the paper pattern (asperity pattern of a paper surface). Instead of the width of speckles, another appropriate pattern-related size, such as the length of a speckle, the distance between speckles, the distance between the front edges of two adjacent speckles, or the distance between the back edges of two adjacent speckles may be used. It is known that the average speckle size can be determined from the following equation (1):

$$\text{average speckle size} = \lambda \cdot R/d \qquad (1)$$

wherein, $\lambda$ represents the wavelength, R the distance from the reflecting point, and d the diameter of the laser beam.

As represented by the equation (1), a speckle having a Gaussian average of 5 to 10 micrometers can be produced by strictly limiting the laser beam for use. That is, the distribution of speckles on the surface of the sheet having microscopic asperities can be clearly observed.

The image sensor 609 requires a sufficient number of scan pixels for observing the distribution of speckles. If the size of a speckle read by the image sensor 609 cannot be made small, lenses are additionally disposed before and after the imaging lens 608, for enlarging the reflected light, such that the enlarged reflected light having a resolution required for determining an interference pattern caused by asperities on the surface of the sheet can be read from below.

Figure 8:
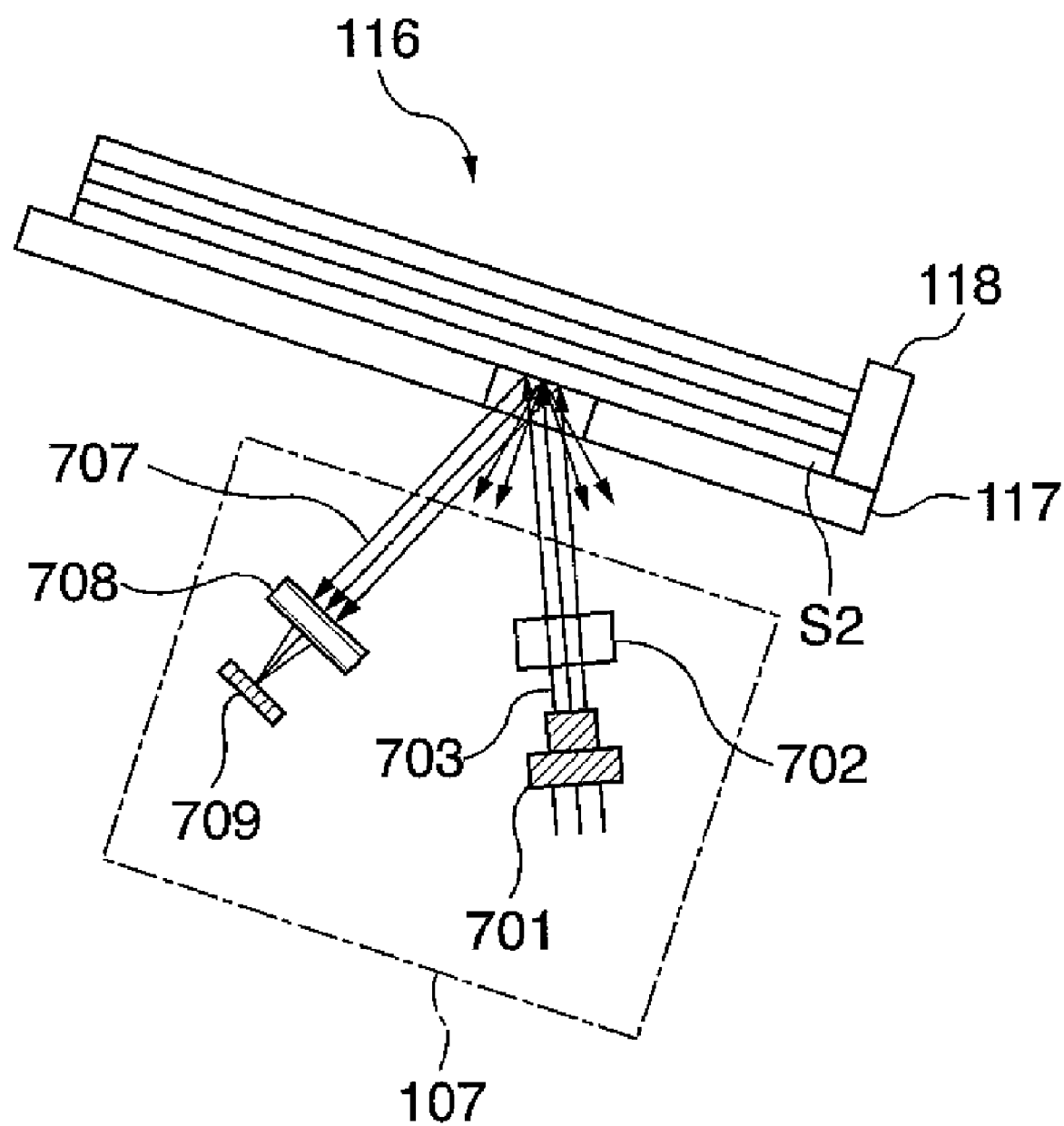
FIG. 8 is a diagram showing the arrangement of a sheet-unique information-reading unit (second paper pattern-detecting unit) which is mounted on the bookbinding apparatus appearing in FIG. 1.

FIG. 8 is a diagram showing the arrangement of the second paper pattern-detecting unit 107 which is mounted on the bookbinding apparatus appearing in FIG. 1.

As shown in FIG. 8, the second paper pattern-detecting unit 107 is disposed under the sheet aligning section 116 of the bookbinding apparatus 104.

The second paper pattern-detecting unit 107 is also a reading means which makes use of laser speckles. The laser beam 703 is produced by a laser light source 701, and a collimator lens 702 for collimating the laser light emitted from the laser light source 701.

The laser beam 703 irradiated onto a cover S2 of a sheet for bookbinding through a laser beam-passing opening formed at the bottom of an aligning tray section 117 of the sheet aligning section 116 is reflected as coherent light formed by interference of light due to microscopic asperities on the surface of the front cover S2, to thereby generate interference pattern-indicating reflected light 707.

The generated interference pattern-indicating reflected light 707 enters an image sensor 709 through the imaging lens 708. The image sensor 709 is implemented by a two-dimensional image area sensor such as a CCD or CMOS area sensor that has a wavelength sensitivity capable of sensing the wavelength of the laser beam 703.

The laser light source 701, the collimator lens 702, the imaging lens 708, and the image sensor 709 are combined to form a unit for observing laser speckle.

As shown in FIG. 7, the laser light source 701 as a laser emitting means is controlled by the CPU 402, and the image processing section 404 binarizes the interference pattern-indicating reflected light 707 read by the imaging sensor 709. Further, the second paper pattern-detecting unit 107 operates similarly to the first paper pattern-detecting unit 106 shown in FIG. 6.

Figures 9, 10A:
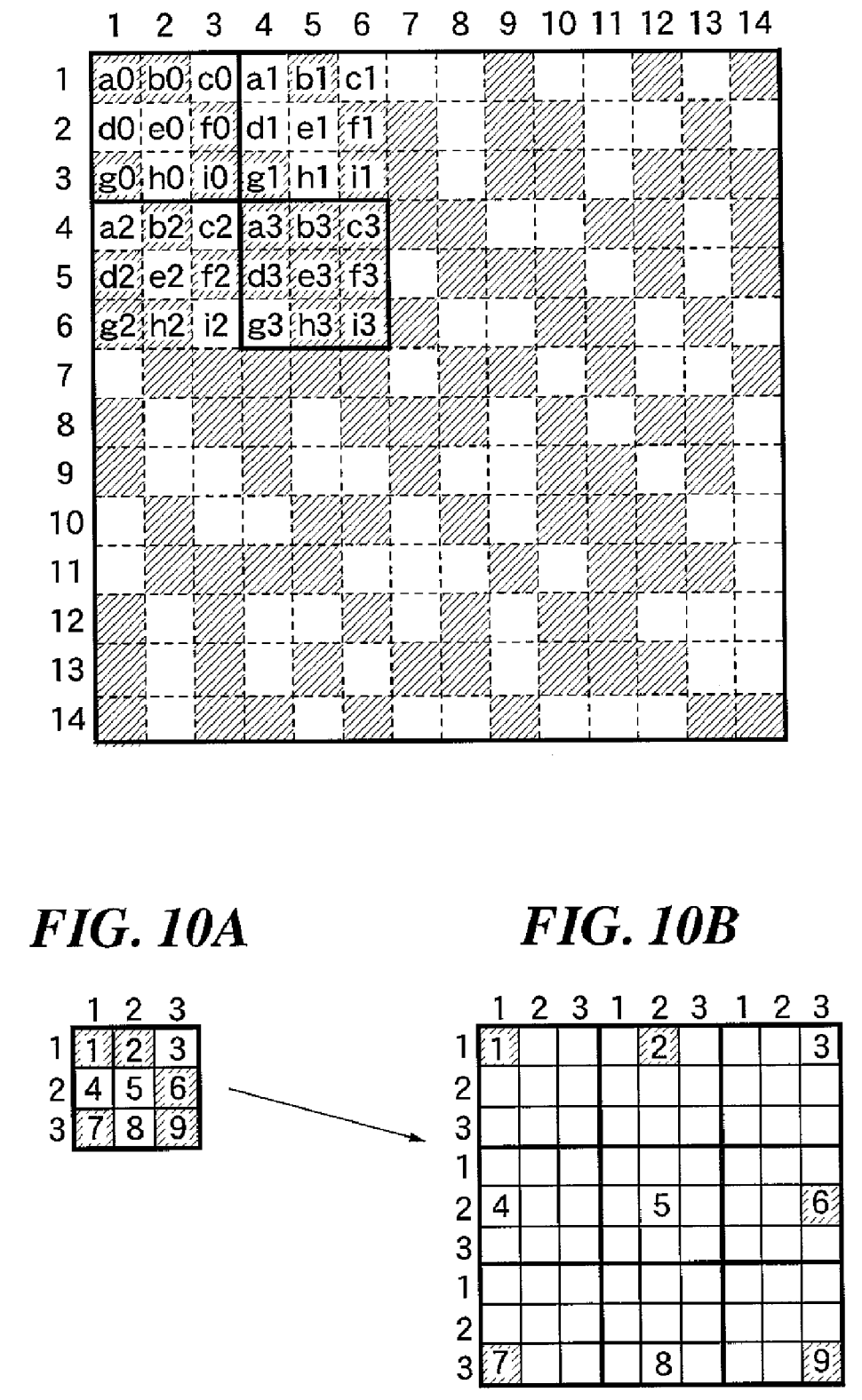

FIG. 9 is a diagram showing an example of an image of a interference pattern read by the first or second sheet-unique information-reading unit shown in FIG. 6 or 8.

Hatched areas in FIG. 9 represent an interference pattern of coherent light produced by causing the laser beam to be irradiated onto the surface of a sheet and reflected therefrom. The image of FIG. 9 is obtained by binarizing data indicative of the interference pattern obtained by the image sensor 609 or 709.

Further, in FIG. 9, the interference pattern is observed using a 14×14-pixel area, this is an example simplified for the explanation. It is obvious that the interference pattern can be observed using an area of a larger number of pixels, i.e. by reading the larger number of pixels.

FIG. 10 is a diagram useful in explaining an example of a dispersing process required to add an image of the interference pattern read by the sheet-unique information-reading unit shown in FIG. 6 or 8 to the image data.

In adding the image of the interference pattern to the image data, yellow is used because yellow is less perceptible to the human eye so that the visual quality of an output image is prevented from significantly degraded. However, although yellow dots are less perceptible to the human eye, areas where yellow dots are densely arranged are visible to the human eye.

Therefore, in adding the interference pattern in the form of yellow image data, sparse yellow dots formed by dispersing the interference pattern are used instead of using yellow dots directly formed from the interference pattern itself. As a result, the interference pattern added to the image data becomes imperceptible to the human eye, which makes it possible to prevent degradation of visual quality of the output image.

FIGS. 10A and 10B are examples illustrating an example of the dispersing process, and a basic principle of the dispersing process will be described with reference to FIGS. 10A and 10B. It is assumed that the read image of an interference pattern is formed by 3×3 pixels. As shown in FIGS. 10A and 10B, addresses 1, 2, 3, . . . , 9 are assigned to the respective pixels.

Then the image is enlarged to an image consisting of 9×9 pixels for dispersion of the interference pattern such that the pixels of the 3×3-pixel image correspond to pixels of the 9×9-pixel image shown in FIGS. 10A and 10B to which addresses 1, 2, 3, . . . 9 are assigned in beforehand. The addresses shown in FIGS. 10A and 10B and assigned to the dispersed image are shown only by way of example, and there is no problem of setting the respective positions of the assigned pixels as desired.

Figure 11B:
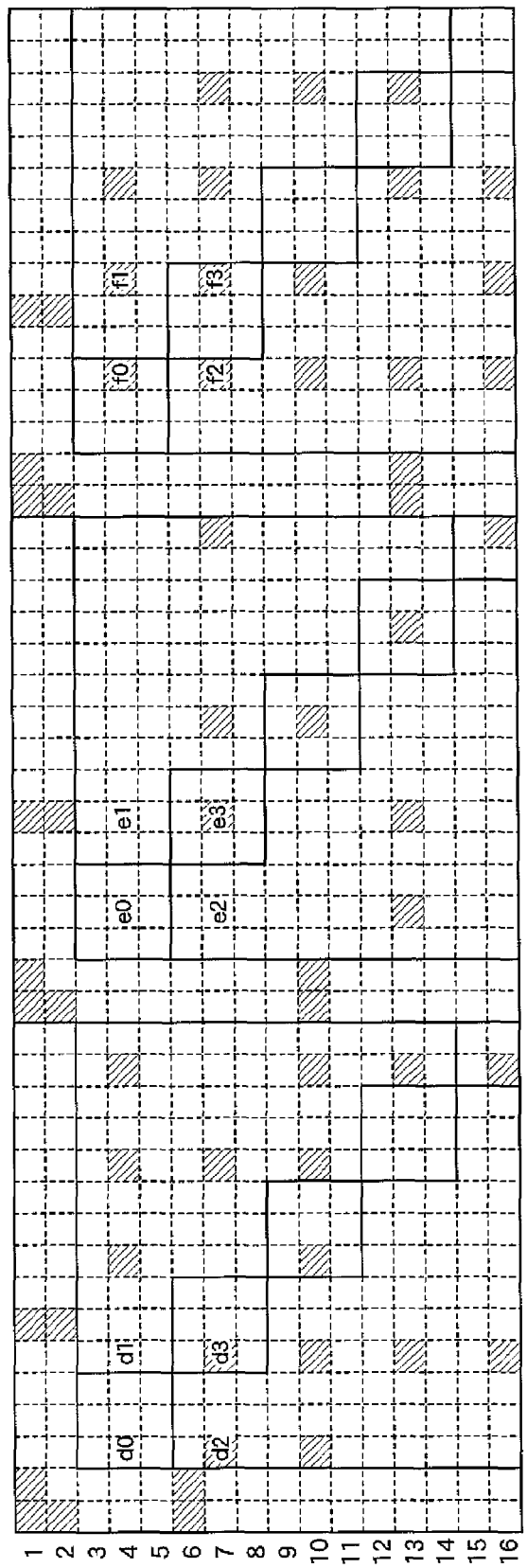
FIG. 11 is a diagram showing an example of a pattern formed by dispersing the interference pattern shown in FIG. 9 by the dispersing process described with reference to FIGS. 10A and 10B.
Figure 11C:
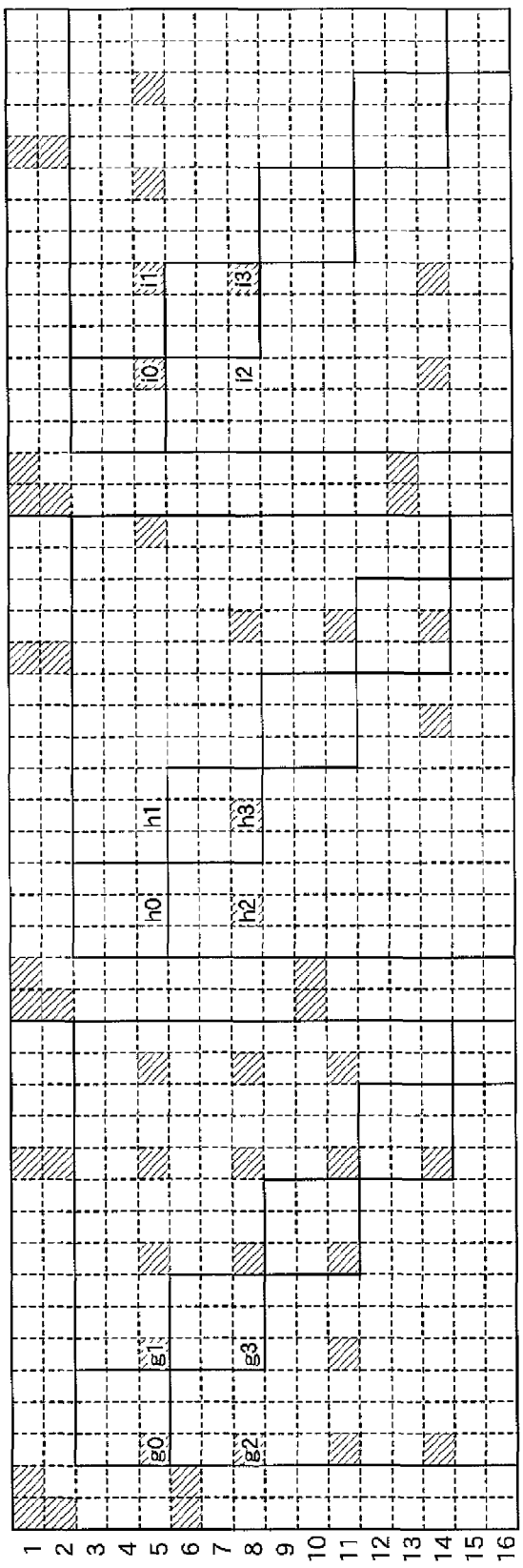

FIG. 11 is a diagram showing an example of dispersion of the interference pattern shown in FIG. 9 using the dispersing process described with reference to FIGS. 10A and 10B.

FIG. 11 shows an example of dispersion of the interference pattern in which each image area of 3×3 pixels in the 14×14-pixel image shown in FIG. 9 is dispersed in a 48×48-pixel image shown in FIG. 11. The image of the interference pattern shown in FIG. 9 is divided into images of 3×3 pixels, and addresses a0-i0, a1-i1, a2-i2, a3-i3, and so on are assigned to the pixels of the images.

Addresses assigned as shown in FIG. 9 are input to address values which are assigned beforehand to the 48×48-pixel image for dispersion. Here, address assignment to the image generated by the dispersing process in FIG. 11 will be further detailed below, according to the example of dispersing the image area of a0 to i0 in FIG. 9.

Referring to FIGS. 12 and 13, an example of a method of indicating the addresses will be described.

Figure 12B:
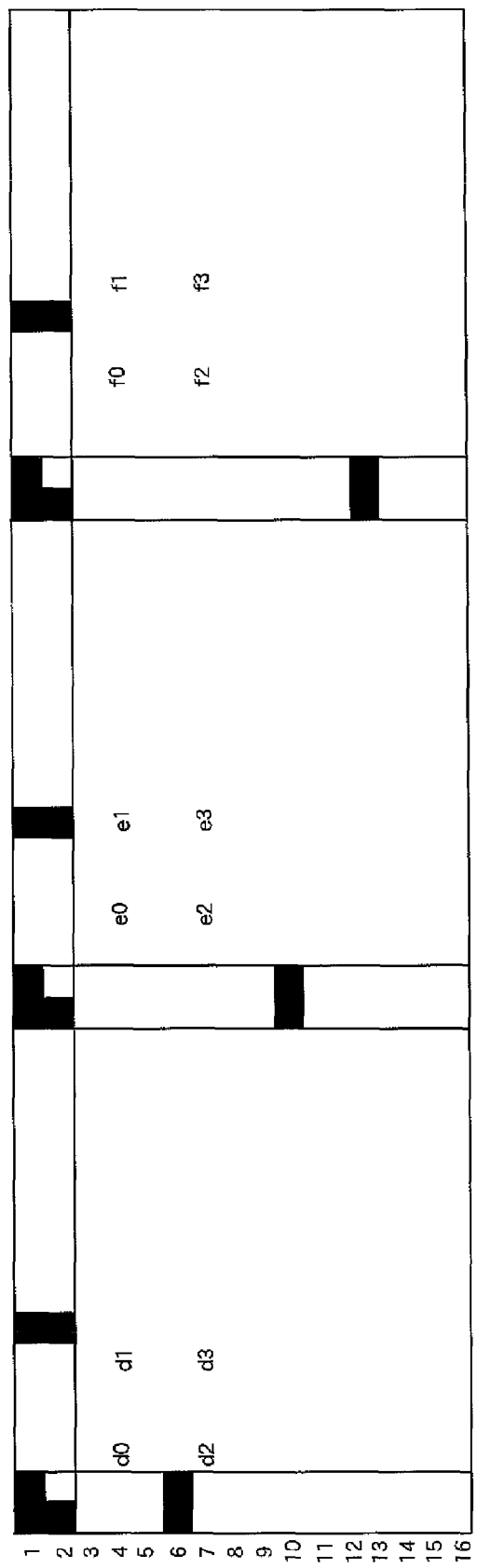
Figure 13D:
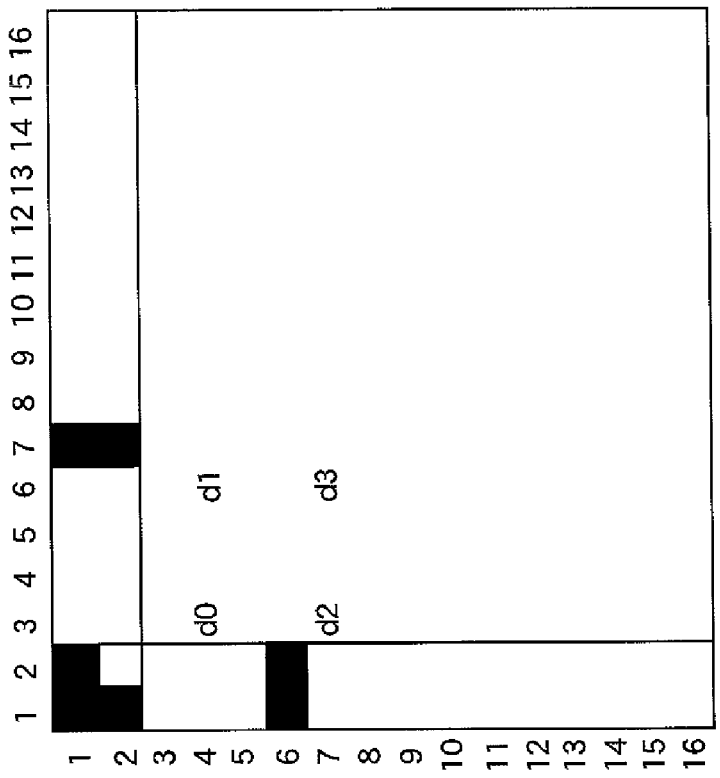
Figure 13C:
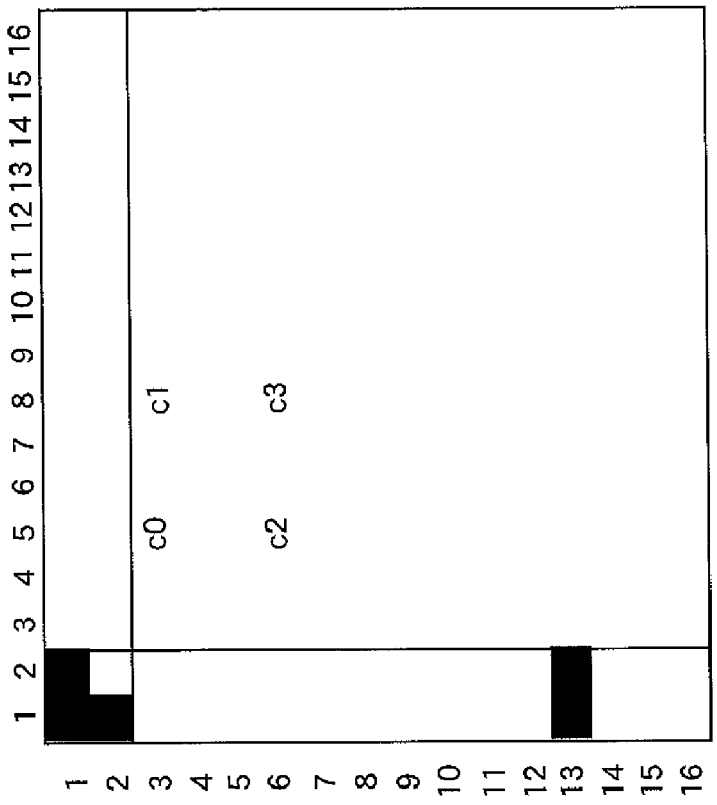
Figure 13F:
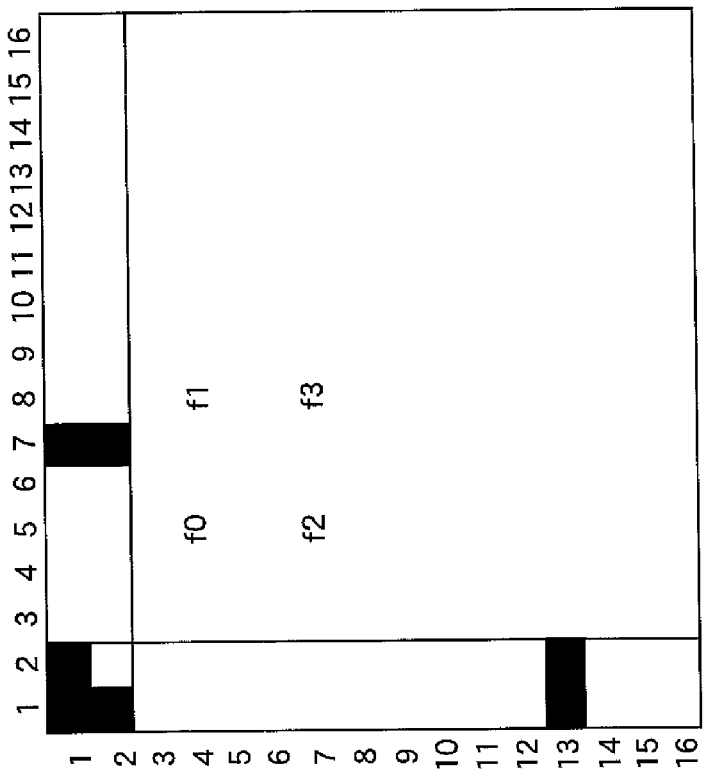
Figure 13E:
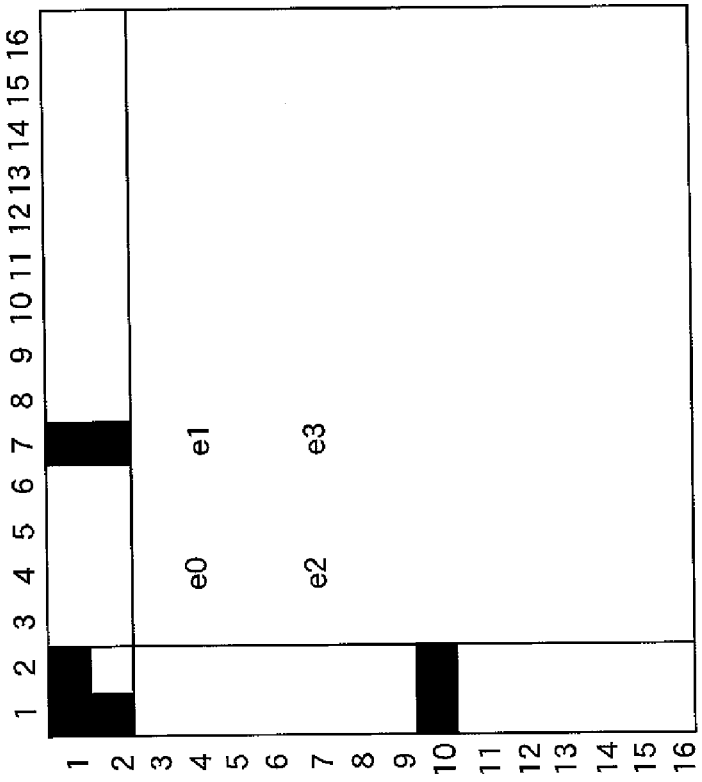
Figure 13H:
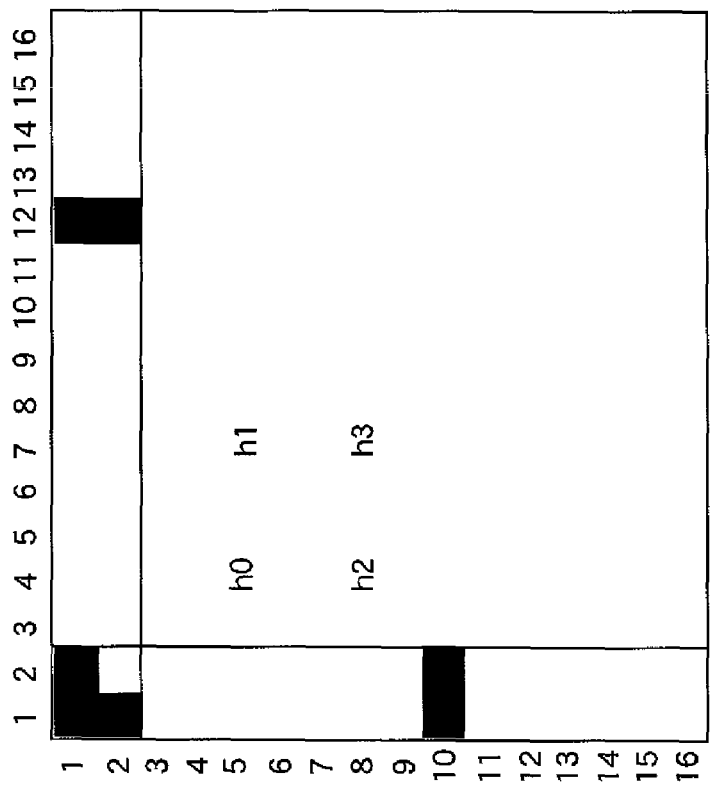
Figure 13G:
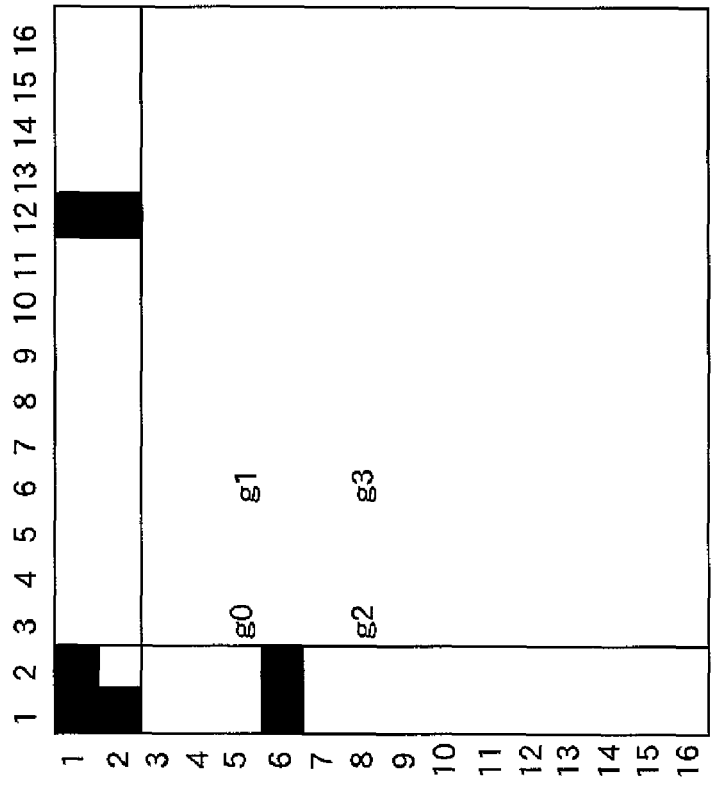
Figure 13I:
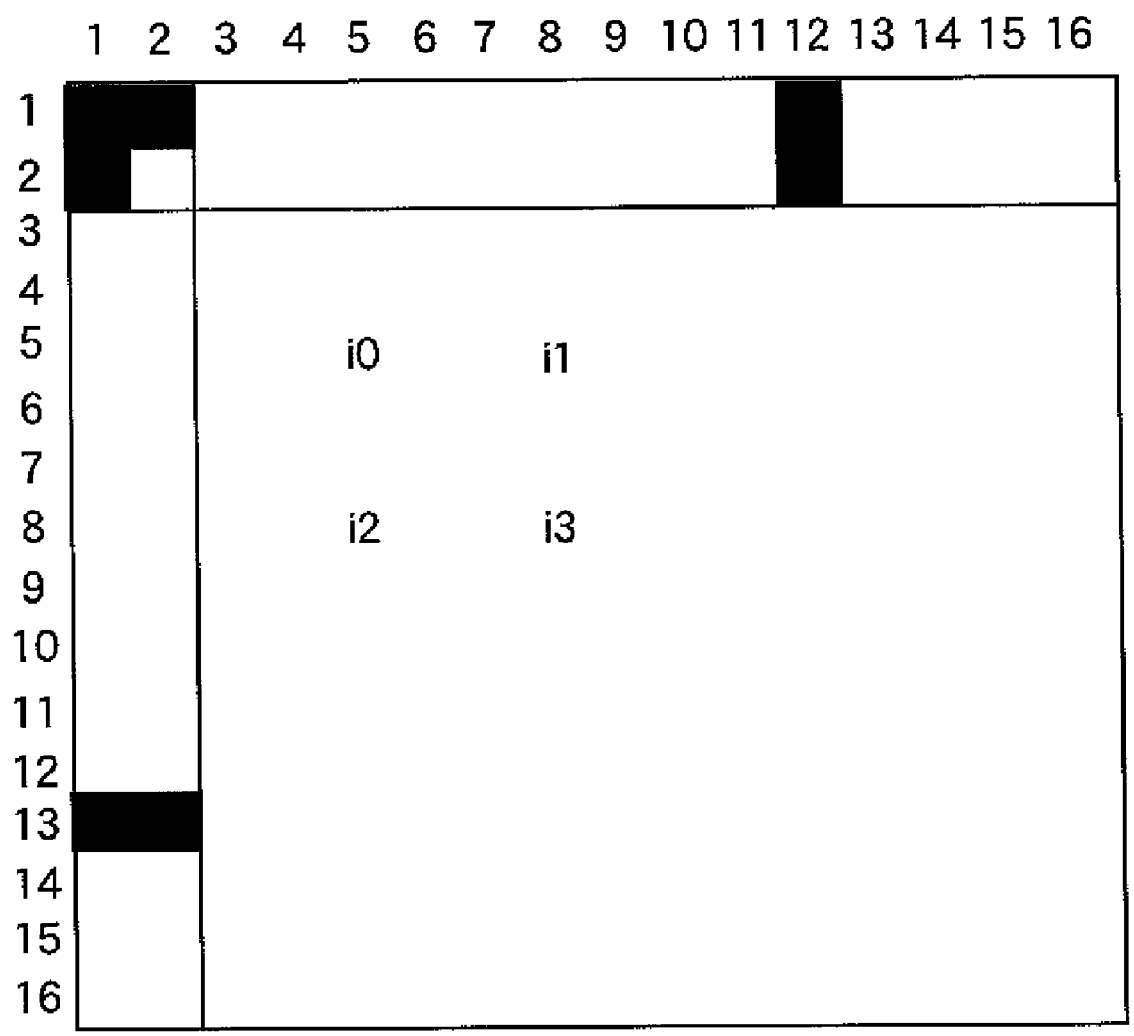

As shown in FIGS. 12A to 12C, first, the 48×48-pixel image is divided into 16×16-pixel image areas. A pixel area corresponding to pixel numbers 1 and 2 along the vertical axis at the upper end of each 16×16-pixel image area and a pixel area corresponding to pixel numbers 1 and 2 along the horizontal axis at the left end of the same are address-indicating areas used for indicating which of the nine areas of the 48×48-pixel image the 16×16-pixel image area corresponds to.

First, input to a 16×16-pixel image area at the top left corner are pixels indicated with "a" in the 14×14-pixel-image. Input to a 16×16-pixel image area at the top middle are pixels indicated with "b" in the 14×14-pixel-image, input to a 16×16-pixel image area at the top right corner are pixels indicated with "c" in the 14×14-pixel-image, and so on.

Referring to FIGS. 13A to 13I, a description will be given of how the address of an image area is indicated using the two leftmost pixel columns and the two uppermost pixel rows in the 16×16-pixel image.

FIG. 13A shows the 16×16-pixel image at the top left corner of the 48×48-pixel image. A pattern of 2×2 pixels at the top left corner of FIG. 13A represents the orientation of the 16×16-pixel image. Next, the presence of a 2-pixel image formed by the 6-th row of respective two pixels of the two leftmost pixel columns indicates that this image area belongs to the leftmost row of the nine image areas of the 48×48-pixel image each formed of 16×16 pixels.

The absence of an image (dots) formed by the 3rd or subsequent column of respective two pixels of the two uppermost pixel rows indicates that this 16×16-pixel image area belongs to the uppermost row of the nine image areas of the 48×48-pixel image.

Thus, it is indicated that the 16×16-pixel image in FIG. 13A belongs to an area corresponding to the first column from the left and at the same time to the first row from the top of the nine areas of the 48×48-pixel image. The image data is formed such that the addresses of the other image areas are also indicated in the same manner as described above.

Referring again to FIG. 11, the 14×14 pixels of the 16×16-pixel image at the top left corner, excluding the two leftmost pixel columns and the two uppermost pixel rows used for address indication are allocated to the areas for dispersing the pixels indicated with "a" (a0, a1, a2, a3, . . . ) in FIG. 11.

As shown in FIG. 11, the pixels a0, a1, a2, and a3 in FIG. 9, for example, are allocated to pixels a0, a1, a2, and a3 in FIG. 11, respectively, whereby the pixels in FIG. 9 are dispersed. By similarly dispersing the other pixels in FIG. 9, the image in which dots are dispersed as shown in FIG. 11 is created.

If the rule of the dispersion described above is known, it is possible to accurately reproduce the interference pattern read from the sheet when an output image in which this image representative of the interference pattern is embedded is read. Therefore, by reading the pattern, it is possible to determine whether or not the finished book has the image information on an original thereof.

According to the present embodiment, even when the file name of image data of the original of the finished book or the storage folder of the image data is unknown or difficult to confirm, it is possible to positively output an original of the finished book only if there is the front cover of the finished book and the operator has authority to output an original of the finished book. Further, even when the original data is modified, if only the operator has output authority, it is possible to make a book by causing the latest version of data to be output even if the finished book itself is of the older version. This also applies to the cases where part of the book is missing, or an interleaved sheet, such as an inserter, is used for the front cover.

Although in the present embodiment, the paper pattern is used as sheet-unique information (information unique to the sheet), it is also possible to have the same effects by adding a mark, such as a barcode or a QR code to a sheet used for the front cover of the finished book.

When using the mark as the sheet-unique information, the sheet unique information-reading unit reads the mark information added by a marking means to thereby identify the mark information. The mark can be printed by a printing device, such as a BJ (Bubble Jet) printer or a marking press, or by the image forming device 103 of the image forming system according to the present embodiment.

Further, although in the present embodiment, the processing operations include a flow of personal authentication, the flow can be omitted when the personal authentication is unnecessary.

In the present embodiment, the storage and collation of data for making a book and personal authentication data are executed by the memory section 303 and the ID collating section 302 of the host sever 300, respectively. However, in the case where communication with the host server 300 is not performed, the CPU 402 may perform the collation of the data for making a book and the personal authentication data stored in the memory section 403 of the system controller 400.

Further, the present invention is applied to a casing-in bookbinding apparatus, a glue bookbinding apparatus, a staple bookbinding apparatus, a ring bookbinding apparatus, and like bookbinding apparatuses.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-129404, filed May 15, 2007, which is hereby incorporated by reference herein in its entirety.

What is claimed is:

1. An image forming system in which an image reading device, an image forming device, and a bookbinding apparatus are connected, comprising:

a sheet-unique information-reading unit configured to read sheet-unique information from a sheet to be used for making a book based on image data, the sheet-unique information representing an interference pattern reflected by asperities on a surface of the sheet, the sheet-unique information, consequently, being unique to the sheet due to an arrangement of the asperities on the surface of the sheet, and the sheet-unique information-reading unit comprising a light emitting unit configured to emit light on the sheet, and an image sensor configured to receive the corresponding interference pattern;

a storage unit configured to store the sheet-unique information read by said sheet-unique information-reading unit in association with the image data; and a control unit configured to cause the image data stored in association with the sheet-unique information in said storage unit to be output to said image forming device for printing of the book on at least the sheet read by said sheet-unique information-reading unit;

wherein the sheet-unique information-reading unit is a second sheet-unique information-reading unit disposed in the bookbinding apparatus, wherein the image forming system further comprises a first sheet-unique information-reading unit configured to read sheet-unique information representing an interference pattern and disposed in the image reading device, wherein, after the control unit causes the image data stored in association with the sheet-unique information in said storage unit to be output to said image forming device and the book is printed, (a) said first sheet-unique information reading unit is configured to read subsequent sheet-unique information from a sheet of a book inputted by a user for scanning, (b) said control unit is configured to compare the subsequent sheet-unique information with the sheet-unique information stored in said storage unit, and if there is a match, said control unit is configured to cause the image data stored in association with the sheet-unique information in said storage unit to be output to said image forming device for printing of a subsequent copy of the book.

2. An image forming system as claimed in claim 1, wherein the image data is stored in the image forming device or a server connected to the image forming device.

3. An image forming system as claimed in claim 1, wherein when outputting the image data based on which the book is made, said control unit is configured to refer to personal authentication information of an operator of the image forming system in addition to the sheet-unique information stored in said storage unit.

4. An image forming system as claimed in claim 1, wherein the sheet corresponds to a front cover or a back cover of the book, when printed.

5. An image forming system as claimed in claim 1, wherein the storage unit is configured to store the sheet-unique information read by said sheet-unique information-reading unit in association with the image data by dispersing an image of the interference pattern into the image data.

* * * * *